(12) United States Patent
Richmond et al.

(10) Patent No.: US 11,911,775 B2
(45) Date of Patent: Feb. 27, 2024

(54) PARTICLE SEPARATION APPARATUS

(71) Applicants: John M Richmond, Albany, OR (US); Michael Gray, Albany, OR (US)

(72) Inventors: John M Richmond, Albany, OR (US); Michael Gray, Albany, OR (US)

( * ) Notice: Subject to any disclaimer, the term of this patent is extended or adjusted under 35 U.S.C. 154(b) by 65 days.

(21) Appl. No.: 17/757,815

(22) PCT Filed: Jan. 4, 2020

(86) PCT No.: PCT/US2020/012293
§ 371 (c)(1),
(2) Date: Jun. 21, 2022

(87) PCT Pub. No.: WO2021/137874
PCT Pub. Date: Jul. 8, 2021

(65) Prior Publication Data
US 2023/0338967 A1 Oct. 26, 2023

(51) Int. Cl.
*B03B 5/62* (2006.01)
*B03B 9/00* (2006.01)
*B01D 21/00* (2006.01)
*B01D 21/30* (2006.01)
*B01D 21/34* (2006.01)

(52) U.S. Cl.
CPC .......... *B03B 5/623* (2013.01); *B01D 21/0024* (2013.01); *B01D 21/0087* (2013.01); *B01D 21/302* (2013.01); *B01D 21/34* (2013.01); *B03B 9/00* (2013.01); *B01D 2221/04* (2013.01)

(58) Field of Classification Search
CPC ............ B01D 21/0024; B01D 21/0087; B01D 21/302; B01D 21/34; B01D 2221/04; B03B 9/00; B03B 5/62; B03B 5/623; B03B 13/00

USPC ......................... 209/132, 173, 155, 158, 159
See application file for complete search history.

(56) References Cited

U.S. PATENT DOCUMENTS 3,802,570 A * 4/1974 Dehne ....................... B04C 5/14
209/733
3,851,404 A * 12/1974 Fracke ...................... B04C 9/00
55/DIG. 32
4,101,419 A * 7/1978 Bergman ................... B03B 5/62
209/160

(Continued)

FOREIGN PATENT DOCUMENTS

CN         108816480 A  * 11/2018
WO   WO-2017080936 A1  *  5/2017  ............. B01D 21/26
WO   WO-2019175034 A1  *  9/2019  ............. B01D 21/00

*Primary Examiner* — Gene O Crawford
*Assistant Examiner* — Muhammad Awais
(74) *Attorney, Agent, or Firm* — Scott E. Gilbert

(57) ABSTRACT

A compact hydraulic particle separator apparatus is disclosed. The disclosed apparatus comprises an upper chamber and a lower chamber separated by a partition. A liquid fluid flow upwelling through the partition from the lower chamber is caused to mix with tangential jet of fluid flowing introduced above the partition in the upper chamber produces an upwardly-flowing cyclonic flow within the upper chamber. Particle mixtures containing low- and high-density particles and other solids are introduced into the upper chamber through a feed tube having a mouth that is offset from the center of the upper chamber. Low-density particles are immediately entrained in the cyclonic flow and swept upward and exit the apparatus.

23 Claims, 11 Drawing Sheets

(56) References Cited

U.S. PATENT DOCUMENTS

| | | | | |
|---|---|---|---|---|
| 4,399,027 A * | 8/1983 | Miller | ............... | B04C 5/10 |
| | | | | 209/730 |
| 4,783,272 A * | 11/1988 | Patterson | ............ | B01D 21/245 |
| | | | | 210/801 |
| 4,872,973 A * | 10/1989 | Ikebuchi | ............ | B04C 5/28 |
| | | | | 209/719 |
| 6,109,451 A * | 8/2000 | Grimes | ............ | B04C 3/06 |
| | | | | 209/733 |
| 10,065,197 B2 * | 9/2018 | Richmond | ............ | B03B 13/00 |
| 2008/0264840 A1 * | 10/2008 | Choi | ............ | C02F 3/1247 |
| | | | | 210/151 |
| 2013/0056410 A1 * | 3/2013 | Wu | ............ | B01D 21/02 |
| | | | | 210/512.1 |
| 2015/0224514 A1 * | 8/2015 | Mercado | ............ | B07B 9/02 |
| | | | | 209/159 |
| 2018/0015479 A1 * | 1/2018 | Richmond | ............ | B03B 13/00 |

* cited by examiner

US 11,911,775 B2

PARTICLE SEPARATION APPARATUS

BACKGROUND

Alluvial or placer gold prospecting and mining conventional methods include panning, sluice box and more recently, suction dredging of placer deposits found in stream beds, creek beds and riverbeds. The latter method has become popular among recreational as well as professional placer gold mining and prospecting enthusiasts. The method involves suction to pull silt material from the benthic zones of streams, creeks and river bottoms into a suction hose via a pumping means, and onto a sluice box for separation of silt components by specific gravity or density. As an example, a typical suction dredging apparatus used for placer gold mining comprises a pump, which is often disposed on floating platform or raft. The bottom material comprises a fine silt composed primarily of silica sand and other finely divided minerals. Stones and pebbles of various sizes are also present. A suction hose is used to aspirate, or "vacuum" the bottom silt and small pebbles to a gold recovery system, such as a portable sluice box, may also be mounted on the same floating platform. In some configurations, the sluice box is assembled on the bank of the river, creek or stream, and is built as a permanent or semi-permanent structure on the shore.

In portable suction dredging operations, the sluice box has a short run, and may not be efficient. Siltification takes place as the silt effluent of the sluice box drops back into the water. This, in addition to the disruption of benthic and riparian habitat, current suction dredging practice creates serious environmental destruction for fish and other aquatic wildlife. Siltification causes increased turbidity, as well as release of toxic metals such as mercury into the water column. The state of California has already banned suction dredging in most streams and creeks to protect endangered aquatic species as well as cultural resources. While current suction dredging practices are damaging to the environment, improvements can be made by introduction of equipment of improved design and function to avoid many of the issues that threaten the continuation of the practice. In particular, significant reduction of siltification and bottom disruption is needed.

Panning is an ancient and popular form of batch prospecting of placer deposits for gold and precious stones and minerals. In contrast to suction dredging, it requires only a pan designed for the purpose. As an entirely manual prospecting technique, it is a slow and low yield process.

DETAILED DESCRIPTION

Figure 1:
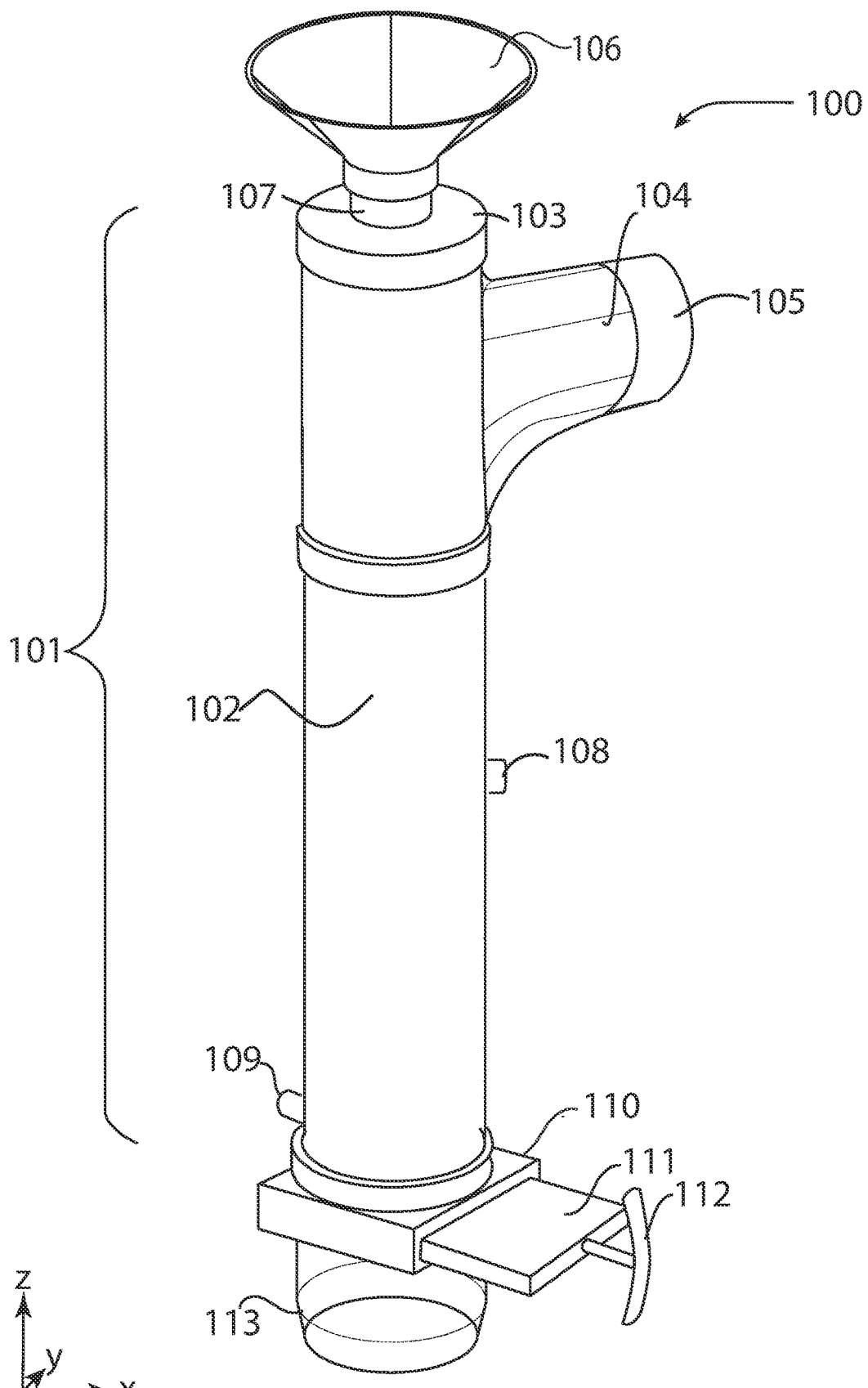
FIG. 1 illustrates an oblique exterior view of a particle separation apparatus, according to some embodiments of the disclosure.

Described herein is a hydraulic gravity particle separation apparatus for highly efficient hydraulic force field separations of high-density particulates from lower density particulates in solids-liquid suspensions, to enhance placer deposit mining or general separation of particles by specific gravity differences. Placer deposit particulates that have high specific gravity, henceforth referred to as high-density particles, may comprise precious metals such as gold, lead, silver, copper brass, hafnium and mercury. Lower density particulates may comprise silica, gravel, magnetite sand, clays, organic matter, and other mineral particles that are found in placer deposits, riparian stream beds and ocean sediments.

By way of example, the density of gold is 19 g/cm$^3$, comprise the highest density (specific gravity) particulates; lead, 11 g/cm$^3$, silver, 10.4 g/cm$^3$, copper, 10 g/cm$^3$, mercury 13.5 g/cm$^3$, and hafnium 13.3 g/cm$^3$, comprise medium-density particulates. The density of silica may range from 2.2-2.7 g/cm$^3$, being a component of the lowest-density particulates. Alumina has a density of approximately 4 g/cm$^3$. Riverbottom silt, for example, has a composition made up primarily of quartz and feldspar (source of alumina and aluminosilicate AlSi$_3$O$_8$) as the main mineral composition of the silt particulate matter. Clays and organic matter are also included in more minor abundances. Both main minerals have a density between 2.2 and 2.7 g/cm$^3$. Silica derived from quartz is the most abundant mineral found in riverbottom silt composition. In traditional methods of placer deposit prospecting, such as sluice box classifying and panning, gold particles are commonly mixed with black sand, comprising primarily magnetite. This mineral has a density of approximately 5 g/cm$^3$.

The particle separation apparatus described in this disclosure affords high-efficiency particulate separations in a compact volume. By high efficiency, it is meant that the separation occurs within seconds with minimal use of resources. Some embodiments include a substantially upright tubular body (hereinafter, separator body), having a substantially circular cross section and tubular wall surrounding an interior chamber. In alternate embodiments, the cross section of the body may be non-circular. In other embodiments, the separator body cross section may have other suitable shapes. A partition within the separator body separates the interior chamber into an upper chamber and a lower chamber. In some embodiments, the partition comprises a funnel-shaped surface having at least one orifice, from which a downspout extends into the lower chamber. In some embodiments, a raw material feed tube extends through the upper chamber to the level of the partition from a slurry inlet at or near the top of the upper chamber.

In some embodiments, the raw material feed tube, (henceforth referred to as the feed tube), descends diagonally from a slurry inlet positioned substantially at the center of the top of the upper chamber, The feed tube terminates near the wall just above the partition. The feed tube may extend from a raw material feed inlet at the top of the apparatus. In some embodiments, the raw material feed inlet is an opening at the top of the separator body that is symmetric about the central axis of the separator body. In some embodiments, the raw material feed inlet is an opening in the top of the separator body. The raw material feed inlet is coupled to any one of an externally-mounted hopper, a pan or an auger, or other suitable apparatus. For example, the hopper may facilitate the introduction of raw material into the apparatus.

In some embodiments, the feed tube comprises two or more vertical portions that are laterally offset from one another. Laterally-offset vertical portions are interconnected by a bend. The bend may be defined as a diagonally-extending portion in the feed tube interconnecting two offset vertical portions. In some embodiments, the feed tube comprises a first portion that extends substantially through a central axis of the upper chamber. The first portion of the feed tube may be substantially parallel to the chamber wall. The feed tube central axis and the upper chamber central axis may be substantially coincident. The feed tube may bend toward the chamber wall, deviating off-axis to a second portion of the feed tube, In some embodiments, the second portion is laterally offset from the first portion. In some embodiments, the second portion is proximal to the wall. In some embodiments, the second portion extends substantially vertically from the diagonal section of the feed tube and may terminate above the partition. In some embodiments, the entirety of the feed tube may extend substantially vertically and off center (e.g., the axis of the feed tube is offset from the central axis of the upper chamber.

During operation of the particle separation apparatus, two fluid streams comprising a suitable separation fluid may be introduced into the separation apparatus. In some embodiments, a first fluid stream may be introduced into the upper chamber above the partition, and a second fluid stream may be introduced into the lower chamber below the partition. Both fluid streams may be introduced through inlets above and below the partition. In some embodiments, the first fluid stream comprises a tangential flow. The tangential flow may be introduced just above the partition through a first inlet. The second fluid stream may be knon-tangential flow introduced into the lower chamber through a second inlet. The second inlet may be any suitable distance below the partition.

Continuing with the example, a clean separation fluid (e.g., water) may be simultaneously introduced in both chambers of the apparatus as described above. The clean separation fluid (e.g., water) may be pumped from a single reservoir, for example. The separation fluid may fill and exit the apparatus through an outlet near the top of the upper chamber. Within the upper chamber, the first inlet may be a tangential flow inlet oriented tangentially to the wall of the chamber. The clean separation fluid introduced tangentially into the upper chamber may initially flow in a circular path following the contour of the wall of the chamber. The tangential stream may spiral inwardly, causing a circular flow pattern of the fluid. A second flow of fluid may be introduced tangentially or non-tangentially into the lower chamber through a second inlet. The second flow may initially fill the lower chamber, then rise upwards through the downspout into the upper chamber. Once the lower chamber is filled by the second fluid stream, clean separation fluid may rise into the upper chamber through the downspout. The upward flow through the downspout may be laminar. Upward-flowing clean fluid from the lower chamber may encounter and mix with the clean tangential flow in the upper chamber. The mixing flows may combine into an upwardly-spiraling flow toward the top of the upper chamber, exiting the apparatus through an outlet.

Once a steady state flow may be established within the apparatus, a raw slurry comprising placer silt may be introduced into upper chamber through the raw material feed tube. In some embodiments, the outlet (e.g., mouth) of the feed tube is laterally offset from the central axis of the upper chamber. In some embodiments, the vertical position of the mouth of the feed tube is proximal to the partition. Tangential flow introduced by the first fluid flow inlet may intersect the mouth of the feed tube. During operation of the disclosed particle separation apparatus, a stream of raw silt slurry may enter the upper chamber near the wall of the chamber, encountering the upward spiral flow near the wall. Initially, all silt particles may be entrained in a three-dimensional flow. The three-dimensional flow may comprise radial flow toward the center of the upper chamber. In addition, the three-dimensional flow may comprise tangential flow along a spiral path, and vertical flow toward the top of the upper chamber.

Centrifugal force may drive all particles entrained in the spiral flow toward the wall of the upper chamber. Low density and light weight particles may be swept inwardly and upwardly by the entrainment, flowing out of the apparatus with the exiting flow. Heavier particles entrained near the wall may sink toward the partition by gravity into the partition.

The higher-density and heavy particles may separate from the lower density particles by gravity. Higher-density and heavy particles may fall onto and be collected by the partition as they sink. In some embodiments, the partition is conical with an apex extending into the lower chamber. In some embodiments, the conical partition may have a tapered or sloping bottom portion with an apex opening to a central orifice. In some embodiments, a tubular downspout extends downward from the central orifice and into the lower chamber. In some embodiments, the downspout extends coaxially within the lower chamber. By the term "coaxial", it is meant that the axis extending through the apex of the conical partition is coincident with the central axis of the upper chamber. In alternate embodiments, the downspout does not extend coaxially within the upper chamber of the particle separation apparatus. The downspout may extend diagonally in some embodiments, or have laterally-offset sections that deviate toward the sidewall of the upper chamber, as described above. The diameter of the downspout may be significantly smaller than the diameter of the upper and lower chambers. High-density particles falling through the partition may continue to separate by gravity from the lower-density particles.

In alternate embodiments, the partition may be substantially flat or have a slope. The slope may be symmetrically arranged about the central axis of the upper chamber. For example, the partition may have a conical shape. In other embodiments, the partition may be arranged asymmetrically with respect to the central axis. In some embodiments, the partition is a flat disc that separates the upper and lower chambers. For example, a flat partition may comprise a plate or mesh. The plate or mesh be either flat or sloped—in one direction. For example, the high-density particles falling on a sloped partition may slide towards an orifice. In some embodiments, the orifice of a sloped partition may be is at the bottom of the slope adjacent to the sidewall of the upper chamber.

Cyclonic flow patterns may be established within the upper chamber by the introduction of the flow streams described above. Adjacent to the sidewall, flow velocities may be low relative to flow velocities further toward the center of the upper chamber. As the mouth of the feed tube may be adjacent to the sidewall of the upper chamber in some embodiments, particles flowing out of the feed tube outlet may be entrained by the slower-moving spiral flow along the sidewall. High-density particles comprising, for example, small gold nuggets, gold flakes, mercury, lead, etc., may be entrained in the slower moving flow along the sidewall. The heaviest particles may fall more readily into the partition than the lighter particles. The lighter particles may be entrained in faster moving flow further toward the central axis of the upper chamber.

Higher-density particles may be entrained in faster cyclonic flow occurring toward the center of the upper chamber. The high-density particles may be projected to the sidewall by centrifugal force, where the flow velocity is smaller. The high-density particles entering the slower cyclonic flow near the sidewall may also drop out by gravity. These particles may fall into the partition and continue to fall through the orifice and downspout, and into the lower chamber. During operation, a secondary flow of separation fluid (e.g., water) may be introduced into the lower chamber through a second inlet opening into the lower chamber. The rate of the secondary flow may be regulated to enable flow from the lower chamber to the upper chamber through the partition. As an example, the flow rate of the secondary flow may be regulated to carry upwards any lower-density particles that may have escaped the cyclonic flow in the upper chamber and fall into the downspout. Such particles may be reintroduced into the upward spiraling cyclonic flow to carry away these particles towards the outlet of the separation apparatus.

In some embodiments, a collection vessel is coupled to the particle separation apparatus below the lower chamber at the bottom of the separator body for collecting the newly separated high-density particulates. In some embodiments, the collection vessel is coupled to the sidewall of the separator body. The collection vessel may be detached from the particle separation apparatus and emptied by decantation or suction through an attached hose or tube.

In some embodiments, a hopper is attached to a coupling opening into the upper chamber through a top wall over the upper chamber. During operation of the apparatus, the hopper may receive untreated silt that is either dug, dredged or otherwise gathered from a placer deposit. The raw silt may be dry silt or naturally wet or mixed with water to form a slurry. The raw placer silt may then be fed into the hopper manually or by automated mechanism, such as, but not limited to, an auger or dredge. In some embodiments, the hopper is a pan having a tapered or sloping bottom that converges at an orifice from which an extension tube opens into the upper chamber. In some embodiments, the feed tube is coupled to the hopper through the extension tube. For example, the hopper may comprise a simple conical pan that is manually fed or fed by conveyer from a dredging apparatus. In other embodiments, the hopper may comprise mechanical fittings such as an auger to facilitate dislodgement of the charged material into the upper chamber. In other embodiments, the hopper may comprise a flat pan or box. In some embodiments, the hopper may include a water flow pipe or tubing for adding to slurry formation of relatively dry silt.

In this disclosure, the vertical orientation is in the z-direction and it is understood that recitations of "top", "bottom", "above" and "below" refer to relative positions in the z-dimension with the usual meaning. However, it is understood that embodiments are not necessarily limited to the orientations or configurations illustrated in the figure.

The terms "substantially," "close," "approximately," "near," and "about," generally refer to being within +/−10% of a target value (unless specifically specified). Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Views labeled "cross-sectional", "profile", "plan", "oblique" and "isometric" correspond to orthogonal planes within a cartesian coordinate system. Thus, cross-sectional and profile views are taken in the x-z plane, plan views are taken in the x-y plane, oblique and isometric views are taken in a 3-dimensional cartesian coordinate system (x-y-z). Where appropriate, drawings are labeled with axes to indicate the orientation of the figure.

FIG. 1 illustrates an exterior oblique view of particle separation apparatus 100, according to some embodiments of the disclosure. In the illustrated embodiment, particle separation apparatus 100 comprises a substantially tubular body 101 (hereinafter, body 101), comprising sidewall 102 extending vertically (e.g., as shown in the negative z-direction) from top wall 103. Sidewall 102 and top wall 103 comprise one or more metal and/or nonmetal structural materials, such as, but not limited to, steel alloys, aluminum and alloys of aluminum, brass, copper, titanium, or alloys of the afore-mentioned metals. Non-metal materials include, but are not limited to, organic polymers such as polymethyl methacrylate (PMMA, Plexiglas), polyethylene terephthalate (PET), polypropylene (PP), polyethylene (PE), polyvinyl chloride (PVC), polyimides (e.g., polyetherimide, Ultem), and inorganic materials such as silicate glasses.

The diameter (or width for non-tubular shape embodiments) of body 101 may range between approximately 10 cm (approximately 4 inches) to over 30 cm (approximately 12 inches or more), depending on the volume of silt to be processed. It will be understood that the diameter or width of body 101 may be scaled to dimensions substantially exceeding 30 cm. Body 101 may have a height ranging from approximately 60 cm (approximately 24 inches) to over 180 cm (approximately 72 inches or more). As noted above, body 101 may be scaled such that the height substantially exceeds 180 cm.

Figure 2:
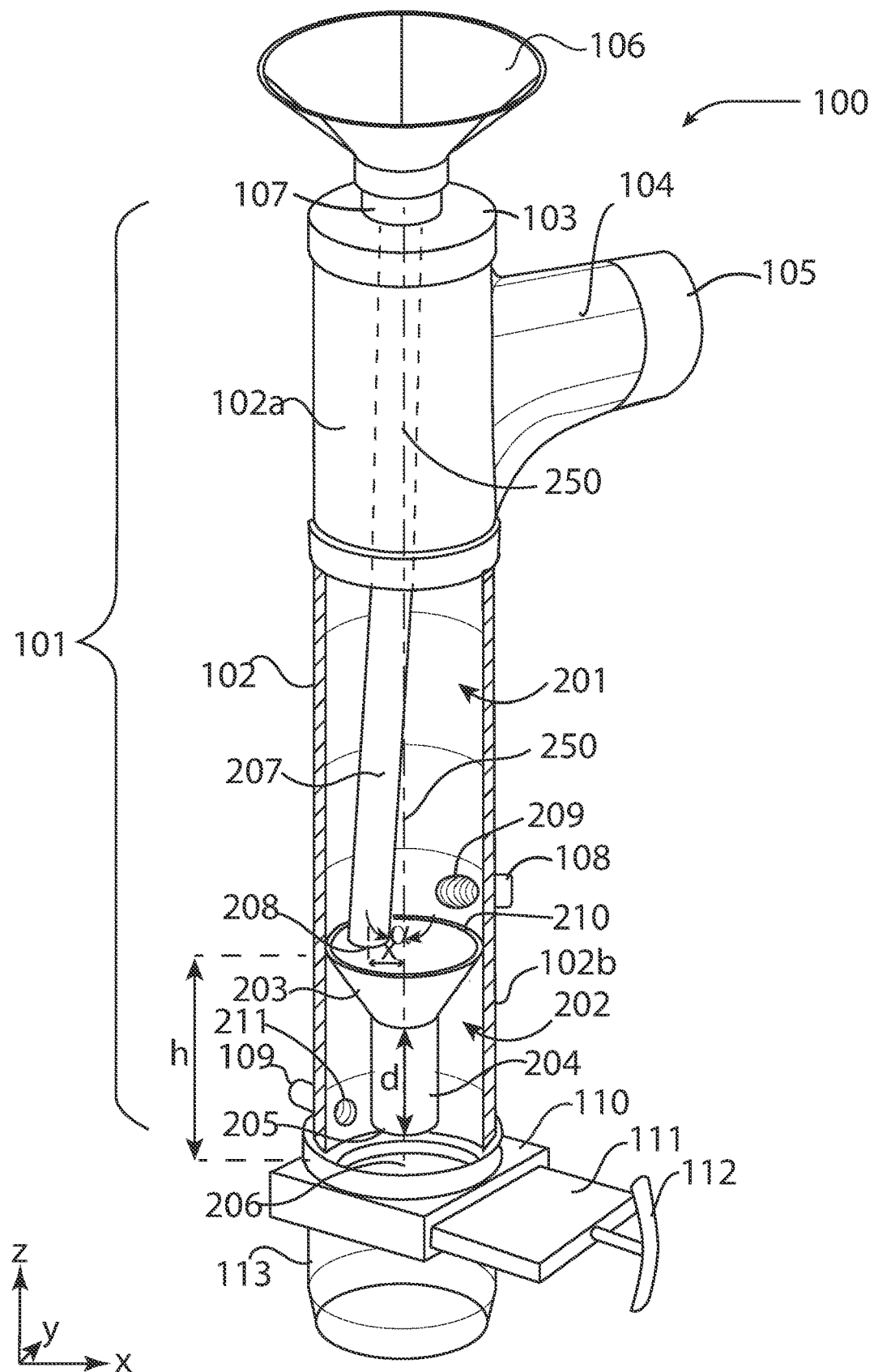
FIG. 2 illustrates an oblique cutaway view of the separation apparatus shown in FIG. 1, showing details of the interior chambers, according to some embodiments of the disclosure.

In some embodiments, top wall 103 is part of an endcap that is integrally bonded to sidewall 102. As an example, top wall 103 is part of a metal endcap that is welded to sidewall 102. In some embodiments, top wall 103 is bonded by an adhesive to sidewall 102. In some embodiments, top wall 103 is removable from sidewall 102. For example, top wall 103 may be an endcap comprising threads that mate with complementary threads on sidewall 102, allowing removal of top wall 103. While body 101 is substantially tubular (e.g., cylindrical) as shown in the illustrated embodiment, other suitable cross-sectional shapes are possible. In the illustrated embodiment, sidewall 102 is a tubular shell enclosing interior chambers, an upper and lower chamber, as described below (FIG. 2). While body 101 is shown in the illustrated embodiment as having a tubular shape, other suitable longitudinal and cross-sectional shapes are also possible. As an example, body 101 may have a non-tubular form factor, such as, but not limited to, a conical form factor or an hourglass form factor (e.g., having a conical upper chamber and a conical lower chamber meet at a constriction near the middle). Body 101 may have an elliptical or ovoid cross section.

Flow outlet port 104 extends laterally from sidewall 102 near the top of body 101 (e.g., near top wall 103). Flow outlet port 104 may have a mouth 105 adapted for connection of a threaded hose or other type of tubing coupling, for example, a quick-disconnect bayonet-type of hose fitting. Mouth 105 may comprise threads to screw on fittings, or may comprise a slip-on receptacle to receive a quick-disconnect fitting, for example. Hopper 106 is connected to body 101 by port 107 extending vertically (e.g., in the z-direction) over top wall 103. In the illustrated embodiment, hopper 106 has a conical shape, suitable for receiving batches of placer silt, for example. In other embodiments, hopper 106 may have a flat pan shape, a cylinder shape, or a rectilinear box shape. Port 107 penetrates through top wall 103 into the interior chamber enclosed by sidewall 102 and top wall 103. Upper and lower flow inlet ports 108 and 109, respectively, extend from sidewall 102 in the middle and bottom portions of body 101, respectively. In some embodiments, upper flow inlet port 108 has is a tangential flow inlet (e.g., having a central axis tangential to sidewall 102). In the illustrated example, upper flow inlet port 108 is approximately at the middle of body 101. In alternate embodiments, upper flow inlet port 108 may be at anther suitable position along sidewall 102.

Lower flow inlet port 109 is proximal to the bottom of sidewall 102. Both upper and lower flow inlet ports 108 and 109 may be threaded to receive a threaded hose or tubing coupling. In alternate embodiments, upper and lower flow inlet ports 108 and 109 may have non-threaded receiving ends to accept quick-disconnect fittings, for example. Upper and lower flow inlet ports 108 and 109 may be sized to any suitable diameter depending on anticipated flow rates. In the illustrated embodiment, lower flow inlet port 109 is shown to be disposed near the bottom of body 101. Lower flow inlet port 109 may extend through sidewall 102, opening into the interior of body 101 at a tangential or a non-tangential angle.

In some embodiments, upper flow inlet port 108 introduces a jet tangentially that evolves into a circulating flow around the wall. Lower flow inlet port 109 may introduce a secondary flow into particle separation apparatus 100. The secondary flow may be non-tangential, where the flow is directed towards the center of the interior chamber (described below). In some embodiments, upper flow inlet port 108 introduces a jet tangentially that evolves into a circulating flow around the wall. Lower flow inlet port 109 within the lower chamber, whereby a second flow is introduced into the cavity of the lower chamber. The second flow need not be tangential, and in particular embodiments is directed towards the center. In all embodiments, the second inlet port may be disposed below the level of the partition (e.g., as shown in FIG. 2). As noted above, the flow introduced by the second inlet port may be tangential or non-tangential, but it engenders an upward vertical flow through the one or more orifices of the partition in the upper chamber once the lower chamber is filled. In continuous operation of the innovative separator apparatus, an upward vertical flow is present in the upper chamber, mixed with the tangential flow to create an upwardly spiral flow pattern in the upper chamber. In specific embodiments, the vertical flow may have a lower flow velocity than that of the tangential flow. In some embodiments, liquid entering the lower chamber of the cavity flows into the upper chamber through the at least one orifice of the partition. In particular embodiments, the partition is substantially conical, as described below, and the lower chamber enters the upper chamber by flowing upwardly through the downspout tube or duct that extends below the partition.

Valve 110 is below lower flow inlet port 109. In the illustrated embodiment, valve 110 may be a housing for a sluice valve (gate valve) comprising gate 111. Handle 112 extends from gate 111. Handle 112 may facilitate manual control of gate 111, whereby gate 111 is a movable partition between body 101 and collection vessel 113. While the illustrated embodiment shows a sluice valve to represent valve 110, any suitable type of valve, such as a ball or butterfly valve.

FIG. 2 illustrates an oblique cutaway view of particle separation apparatus 100, showing details of the interior chambers, according to some embodiments of the disclosure. Body 101 comprises upper chamber 201 comprising upper sidewall 102a and lower chamber 202 comprising lower sidewall 102b, whereby upper chamber 201 and lower chamber 202 are separated by partition 203. In the illustrated embodiment, partition 203 has a conical form. As noted above, partition 203 may have other suitable forms. The means of attachment of partition 203 to sidewall 102 of body 101 are various, and may range from casting techniques, welding or gluing rim 210 of partition 203 to an internal receiving structure such as a flange, or directly to sidewall 102. A seam may be formed about rim 210 of partition 203, for example where rim 210 contacts sidewall 102.

Figure 4:
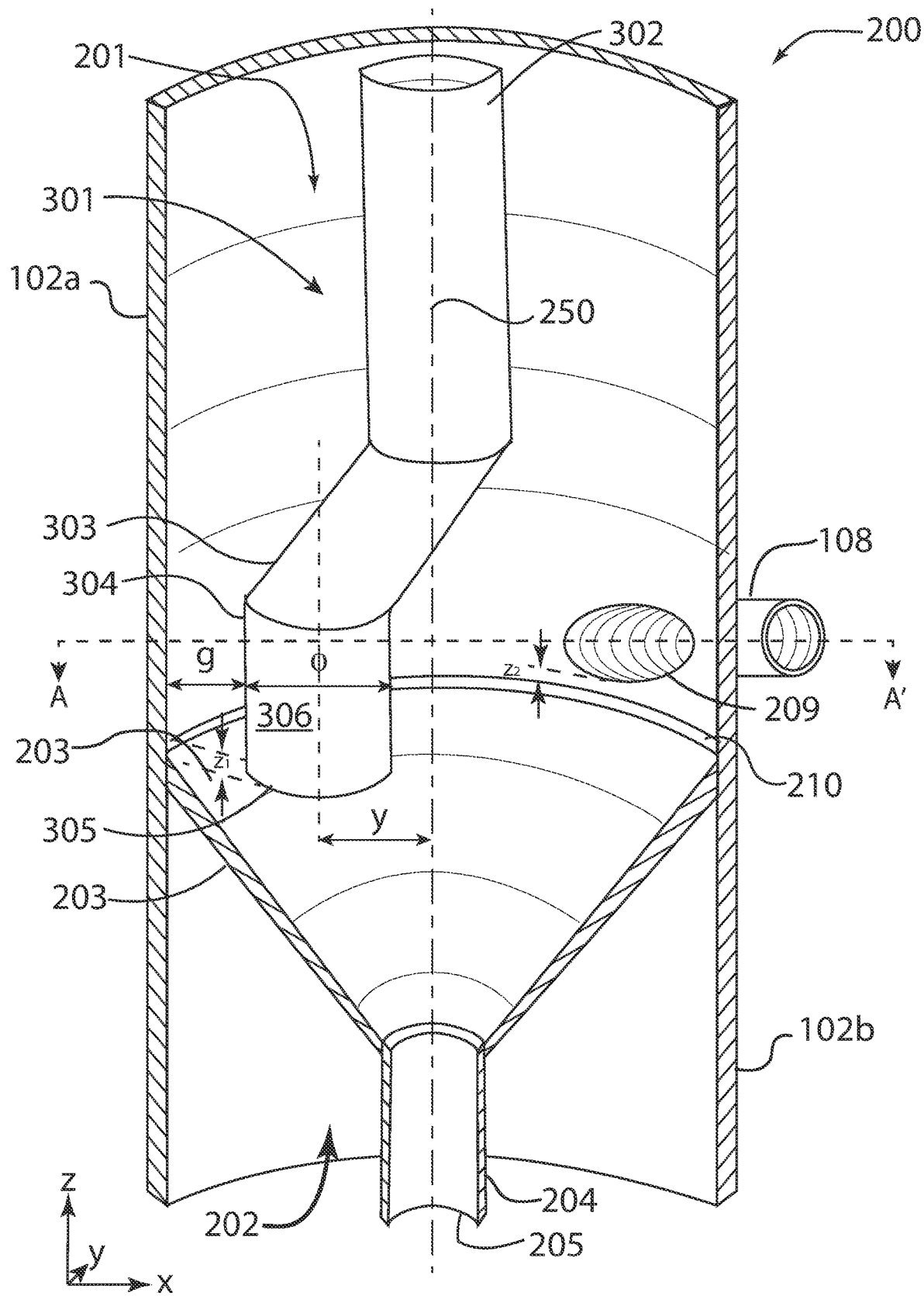
FIG. 4 illustrates an oblique magnified cutaway view in the x-z plane of the particle separation apparatus shown in FIG. 2, showing interior details, according to some embodiments of the disclosure.

Downspout 204 extends vertically downward from an orifice (e.g., as shown in FIG. 4), for example-at the apex of partition 203. Downspout 204 may have a length d that is less than height h of lower chamber 202. Height h may be adjusted to define the volume of lower chamber 202. Downspout mouth 205 may be adjacent to bottom 206 of lower chamber 202. Bottom 206 may be coplanar with gate 111 of valve 110. During operation of particle separation apparatus 100, secondary flow introduced by lower flow inlet port 109 may engender an upward vertical flow through the one or more orifices of partition 203 into upper chamber 201 once the lower chamber is filled with separation fluid. During continuous operation, an upward vertical flow emanating from lower chamber 202 mixes with tangential flow introduced by upper flow inlet port 108 to create an upwardly-spiraling cyclonic flow pattern in In the illustrated embodiment, feed_tube 207 is substantially straight and extends through upper chamber 201. In some embodiments, the velocity of the vertical flow from lower chamber 202 (e.g., introduced through lower flow inlet port 109) to upper chamber 201 through partition 203 may be lower than the flow velocity than the tangential flow introduced into upper chamber 201 through upper flow inlet port 108.

Feed tube 207 extends obliquely through upper chamber 201 from approximately the center of top wall 103 and terminates at feed tube mouth 208. In the illustrated embodiment, the feed tube 207 is not parallel to sidewall 102, descending obliquely from top wall 103, for example at an angle α with respect to central axis 250 (indicated by the alternating dashed line) of body 101. Feed tube mouth 208 is offset from the center of upper chamber 201 (denoted by central axis 250) by a distance x, as shown in the figure. Offset distance x results from the oblique angle α at which feed tube 207 extends through upper chamber 201 with respect to central axis 250 or sidewall 102. Feed tube mouth 208 may occupy a position adjacent to sidewall 102 and may also be immediately above partition 203.

In some embodiments, upper flow inlet port 108 penetrates upper sidewall 102a tangentially, forming a substantially elliptical orifice (e.g., orifice 209) within upper sidewall 102a. While upper flow inlet port 108 is shown immediately above rim 210 of partition 203, upper flow inlet port 108 may be further above partition 203 within upper chamber 201. During operation of particle separation apparatus 100, upper flow inlet port 108 may direct a tangential flow as a stream or jet into upper chamber 201, where the tangential flow of clean separation fluid (e.g., water) introduced through orifice 209 may be directed substantially along a substantially tangent chord to the inner surface of sidewall 102. The tangential flow may follow a spiral path around rim 210 of partition 203.

In the exemplary embodiment shown in FIG. 2, partition 203 is shown to be substantially conical-shaped, In some embodiments, a central orifice is present at the apex of partition 203 from which downspout 204 descends into lower chamber 202 (e.g., see FIG. 4). While lower flow inlet port 109 is shown to be disposed below the level of mouth 205 of downspout 204, other configurations are possible. For example, lower flow inlet port 109 may be disposed above the level of downspout mouth 205 without consequence to the function of separation apparatus 100. In some embodiments, a tube may extend from downspout 204 into the cavity of lower chamber 202.

In some embodiments, lower flow inlet port 109 is below partition 203, opening through orifice 211 into lower chamber 202. While lower flow inlet port 109 is shown to be below downspout mouth 205 in the illustrated embodiment, lower flow inlet port 109 may be positioned at any suitable level within lower chamber 202. During operation of particle separation apparatus 100, lower flow inlet port 109 may introduce a non-tangential flow of clean separation fluid into lower chamber 202. Suitable separation fluids may include liquids such as, but not limited to, substantially pure water, aqueous solutions comprising a surfactant, a soluble inorganic mineral salt at concentrations above natural mineral background levels. Suitable separation fluids may further include an organic salt, an inorganic acid, and inorganic base, an organic acid or an organic base. A separation fluid introduced into lower chamber 202 may flow into upper chamber 201 through downspout 204 when lower chamber 202 fills with the introduced fluid. In some embodiments, the upward vertical flow within downspout 204 may be substantially laminar.

Upon entering upper chamber 201, upward flow emanating from downspout 204 encounters the tangential flow introduced by upper flow inlet port 108, causing an upwardly spiraling cyclonic flow within upper chamber 201. The upward cyclonic flow in upper chamber 201 imposes a centrifugal force on the particles introduced into upper chamber 201 by feed tube 207, causing lower-density particulates to spin laterally as well as being carried upward by vertical fluid forces. As a result of the acentric position of mouth 208 of feed tube 207. Within upper chamber 201, high-density particles as well as lower-density particles of the raw placer silt may be transported to a peripheral region_near sidewall 102, where the angular velocity of the cyclonic flow of separation fluid, as well as the vertical flow component of the cyclonic flow, may be the lowest. In the peripheral region of upper chamber 201, the majority of the high-density particles may not be entrained in the vertical flow. Weak hydraulic forces of impinging vertical flow and angular flow may be overcome by gravitational forces, causing the higher-density particles to sink. The high-density particles may then accumulate against the inner surface of sidewall 102 and slide into partition 203 under the influence of gravity.

The flow rate of separation fluid introduced in lower chamber 202 by lower flow inlet port 109 may be regulated by an external valve to reduce the hydraulic forces of the upward flow through partition 203. The flow rate of the fluid introduced by lower flow inlet port 109 be regulated so that vertical flow into upper chamber 201 may not significantly impede or overcome gravitational forces causing the high-density particulates to drop downwardly through the partition 203 (and downspout 204 extending below the partition, if so equipped). By adjusting the flow rates of the fluid streams entering upper and lower chambers 201 and 202, respectively, the fluid forces may be regulated to obtain a desired separation of particulates having disparate specific gravities (e.g., densities), such as the separation of gold particles, nuggets and flakes from silt components, mostly clays and silicates, mixed with small gravel. The vertical proximity of feed tube mouth 208 to partition 203 may reduce chances of high-density particles being entrained in faster cyclonic flow occurring closer to the center of upper chamber 201 and potentially carried to exit port 104.

At the bottom of lower chamber 202 is collection vessel 113. In some embodiments, collection vessel 113 is attached to body 101 by a threaded receiving portion (not shown). In some embodiments, a flange may be used (described below).

Figure 3:
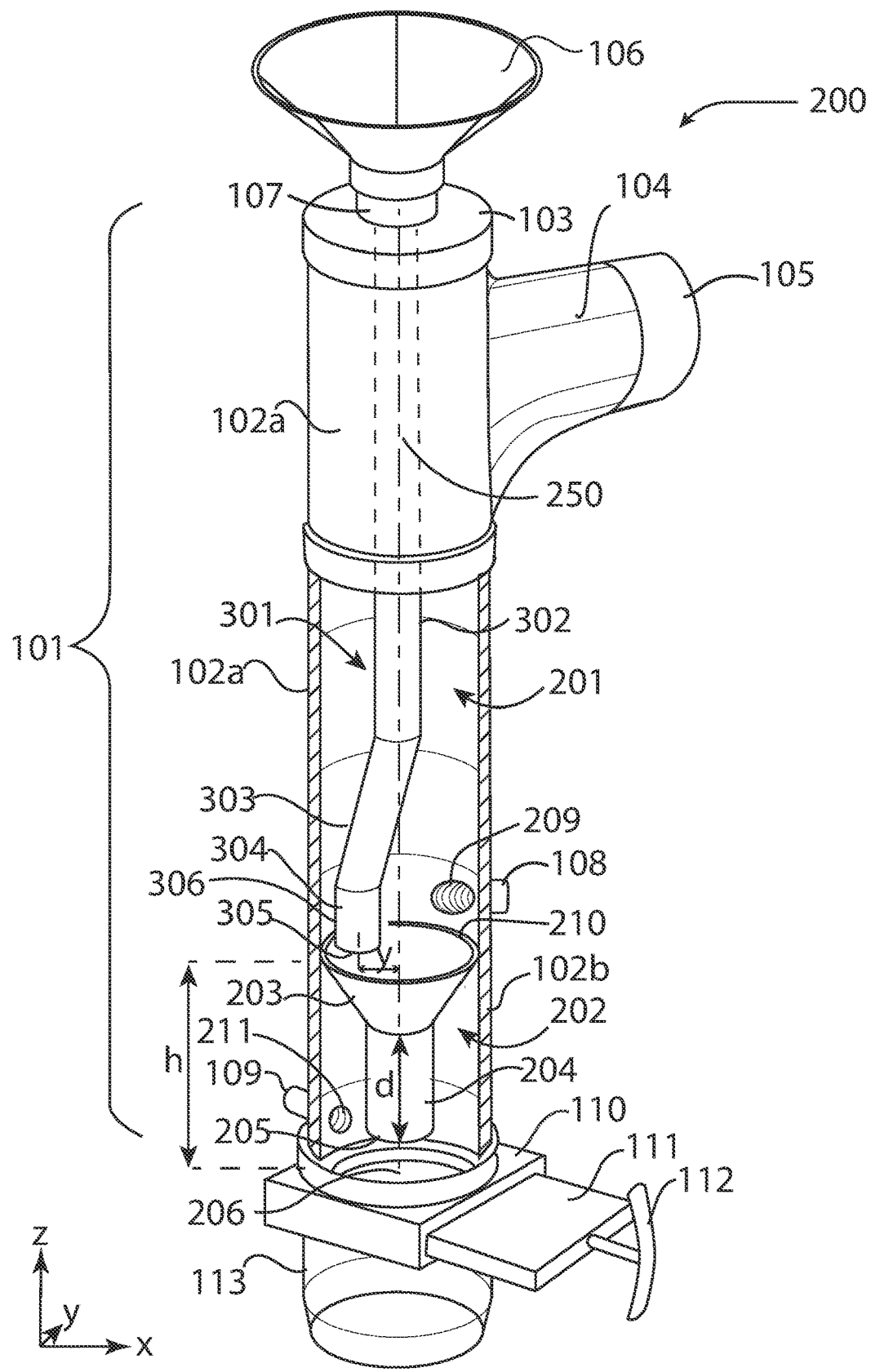
FIG. 3 illustrates an oblique cutaway view of a particle separation apparatus, showing interior details, according to some embodiments of the disclosure.

FIG. 3 illustrates an oblique cutaway view of particle separation apparatus 200, showing interior details, according to some embodiments of the disclosure. In the embodiment illustrated in FIG. 3, separator apparatus 200 comprises feed tube extending into upper chamber 201. Lower chamber 202 is separated from upper chamber 201 by partition 203. As described above, partition 203 may be substantially conical in shape. In alternate embodiments, partition 203 may have other suitable shapes as noted above.

Feed tube 301 comprises multiple non-coaxial segments. Feed tube 301 extends into upper chamber 201 from port 107. In the illustrated embodiment, feed tube 301 comprises three non-coaxial segments, segment 302, segment 303 and segment 304. Segment 302 is a topmost portion of feed tube 301 and may be substantially coaxial with central axis 250. Segment 303 may extend obliquely from segment 302, as shown. Segment 304 may extend substantially vertically from segment 303, as shown, terminating at feed tube mouth 305. In some embodiments, feed tube mouth 305 may be disposed above rim 210 of partition 203. In some embodiments, feed tube mouth 305 may be disposed below rim 210 of partition 203. In some embodiments, segments 302, 303, and 304 have the substantially same diameter. In some embodiments, segment 304 is offset from central axis 250 by a distance y as shown, where y is the distance between the center of segment 304 and central axis 250. In some embodiments, offset distance y is adjusted so that segment 304 is proximal to sidewall 102. In some embodiments, distance y is 25% to 80% of the inner radius of upper chamber (see FIG. 5). The magnitude of distance y may depend at least in part on the diameter of segment 304. As an example, an intervening gap (not shown; see FIGS. 4 and 5) is between sidewall 102 and the rim of feed tube mouth 305.

FIG. 4 illustrates a magnified oblique cutaway view of particle separation apparatus 200, showing interior details in proximal to partition 203, according to some embodiments of the disclosure. In the illustrated embodiment, feed tube 301 comprises segments 302, 303 and 304 as described above and shown in FIG. 3. Segment 302 is coaxial with central axis 250. Segment 304 is offset from segment 302, therefore from central axis 250, by offset distance y. Offset y may be defined as the difference between center lines of segments 302 and 304, indicated in the figure by the dashed lines (referenced to central axis 250) where segment 302 is shown to be coaxial with central axis 250. In some embodiments, segment 302 itself is offset from central axis 250. Segments 302-304 are shown to have diameter (I). In some embodiments, segments 302-304 have different diameters. Gap g is a distance between wall 306 of segment 304 and sidewall 102, and results from the difference between offset y and radius $\phi/2$ of segment 304. Gap g may range between zero and up to 50% of the radius of upper chamber 201 (see FIG. 5). By way of example, gap g may range between 1 cm and 3 cm (approximately inch to over one inch).

Segment 304 terminates at feed tube mouth 305. In some embodiments, segment 304 extends from segment 304 and terminates at feed tube mouth 305. In the illustrated embodiment, feed tube mouth 305 is a distance $z_1$ below rim 210 of partition 203. In some embodiments, feed tube mouth 305 may be at other suitable vertical distances with respect to rim 210. In some embodiments, mouth 305 is above rim 210. Orifice 209 may be a distance $z_2$ above rim 210. By way of example, $Z_2$ may range up to 5 cm (approximately 2 inches). During operation of apparatus 200, high-density silt particles may be entrained in tangential flow introduced by orifice 209. The close placement of feed tube mouth 305 and orifice 209 to partition 203 may enable rapid trapping of high density particles by partition 203.

Figure 5:
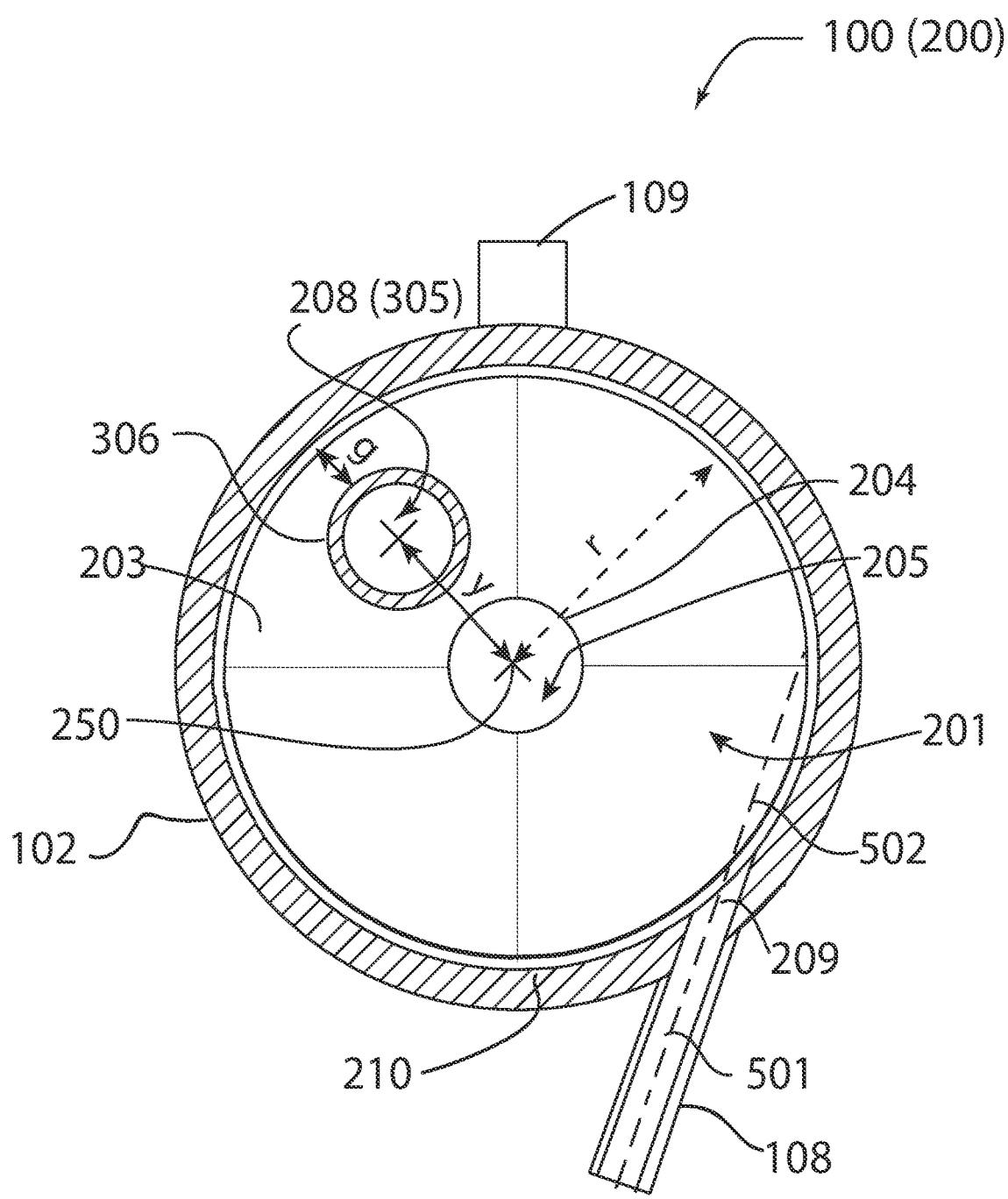
FIG. 5 illustrates a cross-sectional view in the x-y plane of an upper chamber of the particle separation apparatus shown in FIG. 1 or FIG. 2, according to some embodiments of the disclosure.

FIG. 5 illustrates a cross-sectional view in the x-y plane of upper chamber 201 of either particle separation apparatus 100 or 200, showing partition 203 in plan view, according to some embodiments of the disclosure. In FIG. 5, the view is taken along x-y plane A-A' in FIG. 4. The lateral position of feed tube mouth 208 (or equally feed tube mouth 305 of feed tube 301) relative to sidewall 102 and the center of partition 203 (e.g., downspout 204) is shown. The center of feed tube mouth 208 (or feed tube mouth 305) is offset by distance y from center axis 250, leaving gap g between sidewall 102 and an edge of feed tube mouth 208 (or feed tube mouth 305). Offset y may be a portion of inner radius r of upper chamber 201, ranging between 25% and 80% of r. Offset y and gap g may be adjusted to place feed tube mouth 208 (or feed tube mouth 305) within slower cyclonic flow to disperse raw silt exiting feed tube mouth 208 (or feed tube mouth 305) to enable efficient capture of high-density and heavy particles in partition 203 during operation of particle separation apparatus 100 or 200.

Upper flow inlet port 108 opens into upper chamber 201 through orifice 209 extending through sidewall 102 into upper chamber 201 from upper flow inlet port 108. Upper flow inlet port 108 may be substantially aligned tangentially to sidewall 102, where axis 501 of upper flow inlet port 108 is coincident with chord 502 of upper chamber 201 as shown. Chord 502 may be any chord that is substantially tangential to sidewall 102 within an x-y plane (e.g., plane A-A') that cuts upper chamber 201. While feed tube mouth 208 of feed tube 207 (or equally feed tube mouth 305 of feed tube 301) is shown in the figure to be diametrically opposite (e.g., 180°) along the diameter of partition 203 from orifice 209, feed tube mouth 208 (or feed tube mouth 305) may be at any angular position relative to orifice 209. The relative position of feed tube mouth 208 (or feed tube mouth 305) with respect to upper flow inlet port 108 may be at least in part determined from local hydrodynamic behavior of the complex flow pattern set up by the tangential flow introduced by upper flow inlet port 108 mixing with fluid upwelling from lower chamber 202 by fluid introduced through lower fluid inlet port 109 opening into lower chamber 202 below partition 203.

Figure 6:
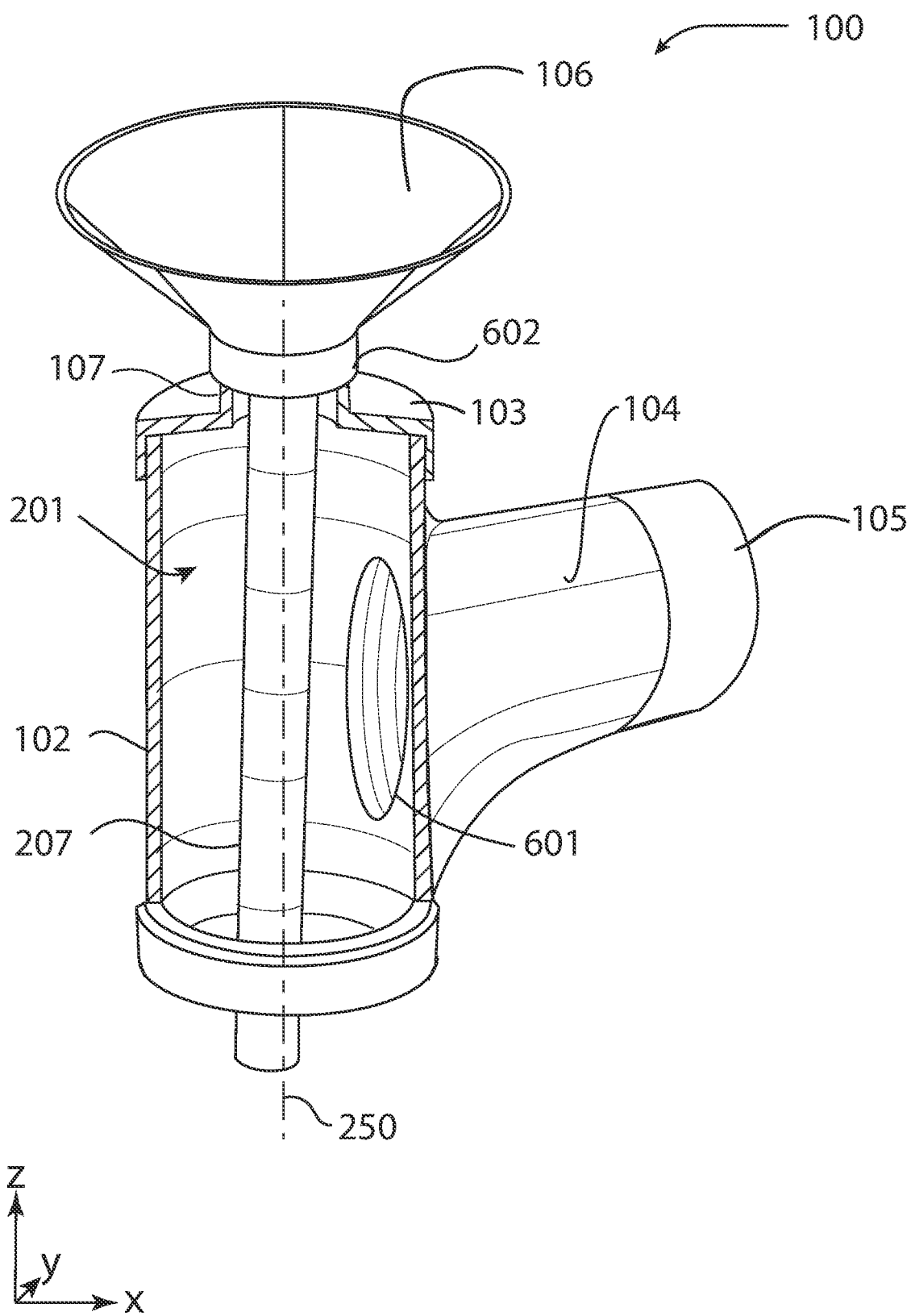
FIG. 6 illustrates an oblique cutaway view of the particle separation apparatus shown in FIG. 1, showing interior details of upper chamber 201, according to some embodiments of the disclosure.

FIG. 6 illustrates an oblique cutaway view of separation apparatus 100, showing interior details of upper chamber 201, according to some embodiments of the disclosure. Flow outlet port 104 opens into upper chamber 201 through orifice 601. In the illustrated embodiment (e.g., particle separation apparatus 100), feed tube 207 extends downward through upper chamber 201, where feed tube 207 has a straight body extending obliquely with respect to central axis 250 of body 101, and to upper sidewall 102a. While the illustrated embodiment shows details of particle separation apparatus 100, the illustrated embodiment may equally pertain to particle separation apparatus 200.

Hopper 106 is coupled to feed tube 207 that extends into port 107. In some embodiments, hopper 106 is fastened to body 101 by a permanent weld or adhesive bond to port 107. In some embodiments, port 107 comprises external or internal threads. Hopper collar 602 may comprise mating threads (not shown), enabling fastening and removal of hopper 106 by turning hopper 106 about port 107. In some embodiments, hopper 106 is bolted to port 107 or to a flange (not shown).

In some embodiments, port 107 may comprise a receiving portion for interchangeable coupling to hopper 106 and other structures, such as, but not limited to, an auger, dredge or slurry pipe. As an example, an auger, dredge or slurry pipe may introduce raw placer silt into the disclosed particle separation apparatus (e.g., particle separation apparatus 100 or 200) continuously or semi-continuously.

Flow outlet port 104 comprises mouth 105 as a coupling to flexible hose, tubing or rigid conduit. Mouth 105 may be threaded for coupling to threaded hose coupling or a conduit or may receive a quick-connect hose coupling. The diameter of orifice 601 and flow outlet port 104 may have a size to accommodate exiting flow without causing a significant backpressure. As an example, exit flow combines both tangential flow introduced into upper chamber 201 by upper flow inlet port 108 and fluid flow into the lower chamber (e.g., lower chamber 202) via lower flow inlet port 109. The combined fluid flow exits through flow outlet port 104.

Figure 7:
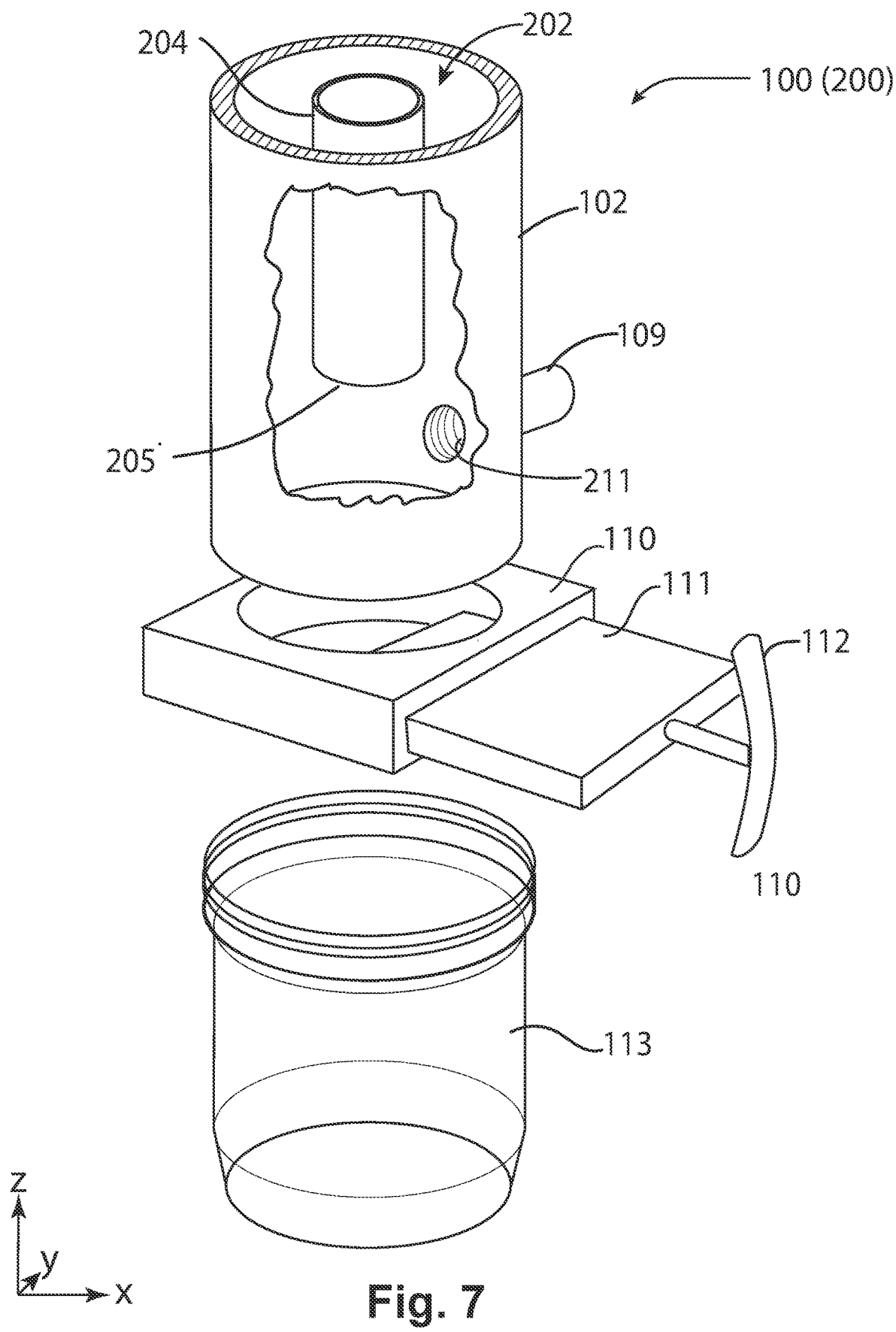
FIG. 7 illustrates an oblique exploded view of a bottom portion of the particle separation apparatus shown in FIG. 1 or FIG. 2, according to some embodiments of the disclosure.

FIG. 7 illustrates an oblique exploded view of a bottom portion of particle separation apparatus 100 (or particle separation apparatus 200), showing a cutaway view of lower chamber 202, according to some embodiments of the disclosure. Downspout 204 extends in the z-direction, downward from the partition (e.g., partition 203, not shown), terminating at downspout mouth. Lower flow inlet port 109 may introduce a non-tangential (e.g., toward the center of lower chamber 202) flow of clean separation fluid (e.g., water) into lower chamber 202. As an example, during operation of particle separation apparatus 100 or 200, the separation fluid (e.g., water) fills lower chamber 202, and flows into the upper chamber through downspout 204. In some embodiments, the volumetric flow rate of clean separation fluid through orifice 211 is lower than the volumetric flow rate into the upper chamber (e.g., through orifice 209 in upper chamber 201), and may produce substantially laminar flow through downspout 204. In some embodiments, the volumetric flow rate through orifice 211 is the same or greater than the volumetric flow rate into the upper chamber. While downspout mouth 205 is shown to be below orifice 211 in the illustrated embodiment, downspout mouth 205 may be positioned to any suitable vertical distance relative to orifice 211 as development of flow in downspout 204 is not sensitive to the relative position of orifice 211 relative to downspout mouth 205.

A valve such as, but not limited to, valve 110 may separate lower chamber 202 from collection vessel 113. While in the illustrated embodiment, valve 110 is depicted as a sluice valve, any suitable valve may be employed. For example, valve 110 may be a ball valve or a butterfly valve. As shown, collection vessel 113 is a transparent container. Collection vessel 113 may comprise silicate glass or an organic polymeric material, such as, but not limited to, polycarbonates, polyesters (e.g., polyethylene terephthalate, PETE), polypropylene, polyethylene, polyimides, polyamides (e.g., nylon) or polyarylsulfones (PAS). Collection vessel 113 may comprise a non-transparent material at least in part, such as a metal (e.g., stainless steel, aluminum), ceramic materials (e.g., aluminum oxide). Collection vessel 113 is further described below.

Figure 8A:
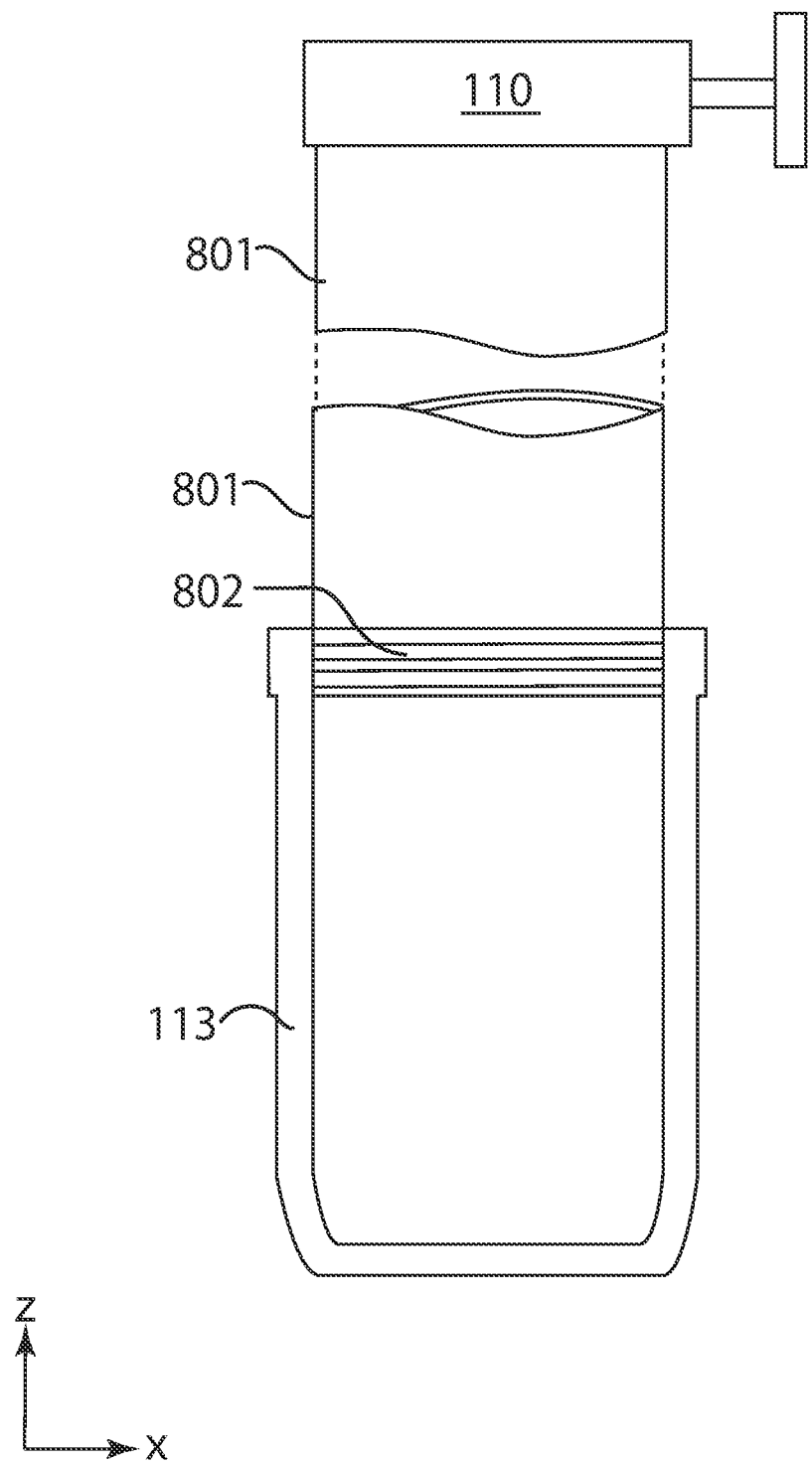
FIGS. 8a and 8b illustrate a profile view in the x-z plane of a collection vessel portion of the particle separation apparatus, according to some embodiments of the disclosure.
Figure 8B:
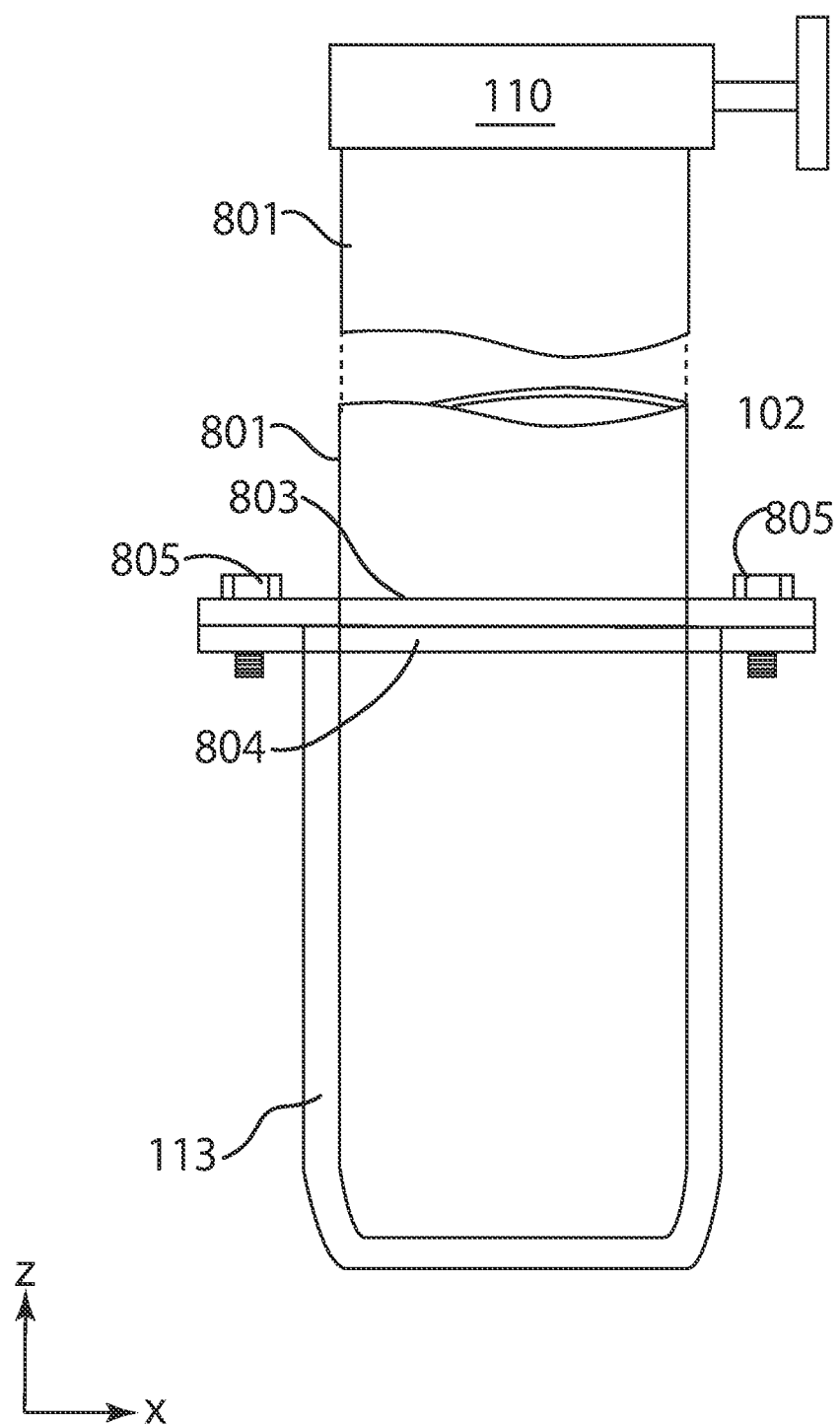

FIGS. 8a and 8b illustrate a profile view in the x-z plane of collection vessel 113, according to some embodiments of the disclosure. In FIG. 8a, receiving member 801 is an extension of lower chamber 202 of body 101, extending below valve 110. Collection vessel 113 is attached to receiving member 801 by threaded interface 802 at the base of receiving member 801. In FIG. 8b, collection vessel 113 is attached to receiving member 801 via flange 803. In the embodiment depicted in FIG. 8b, flange member 804 is integral with collection vessel 113, and may be fastened to flange 803 with bolts 805.

Figure 9:
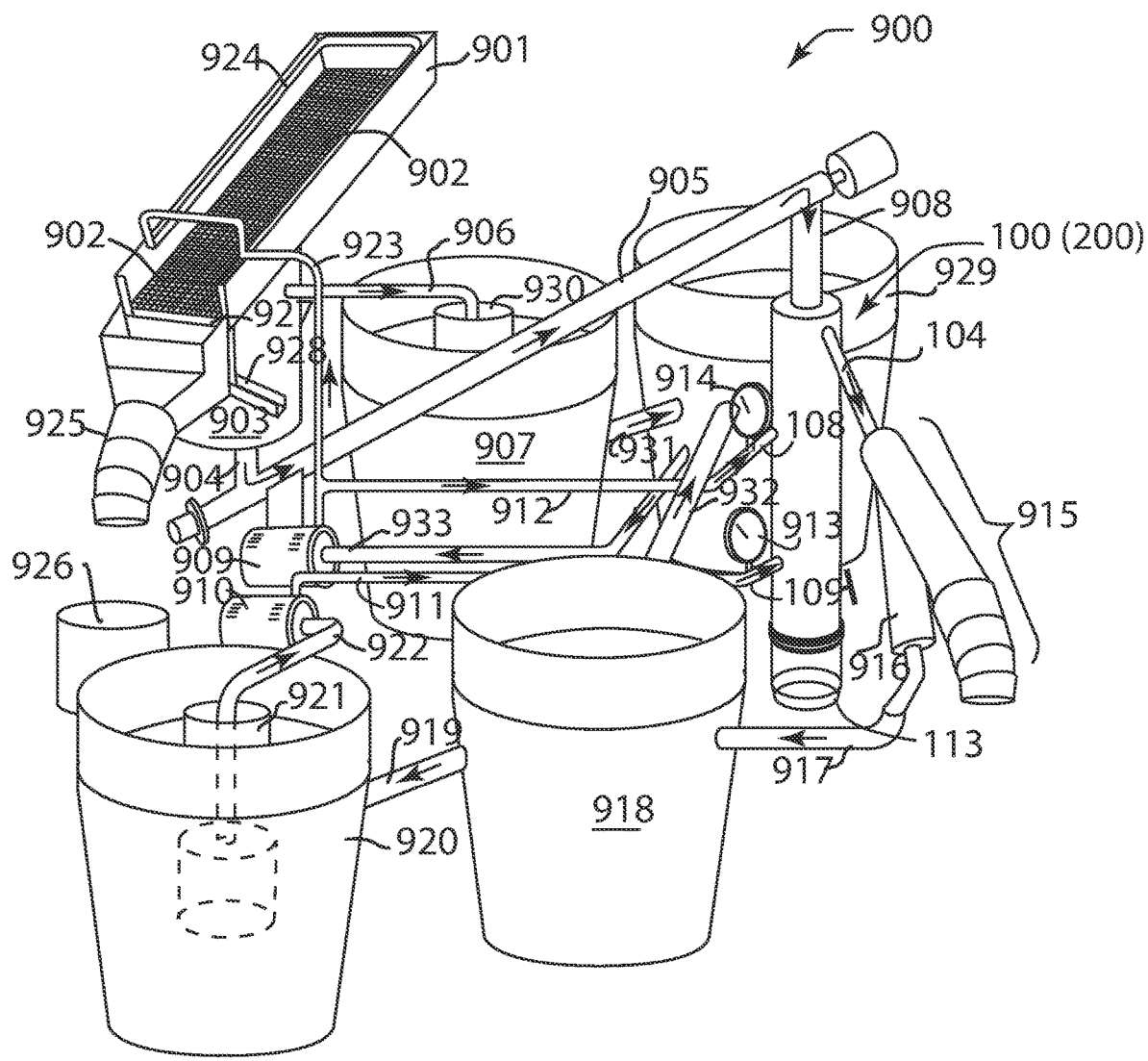
FIG. 9 illustrates a first exemplary system comprising the particle separation apparatus shown in FIG. 1 or FIG. 2, according to some embodiments of the disclosure.

FIG. 9 illustrates an exemplary system 900 comprising particle separation apparatus 100 or 200, according to some embodiments of the disclosure. In the illustrated embodiment, system 900 comprises sluice box 901 for pre-classifying raw placer silt. In alternate embodiments, sluice box may be omitted. Sluice box 901 may be lined with matting mesh 902, adapted to allow fine material and water to fall through the mesh into preliminary settling vessel 903. A partial crude separation of liquid and solids may take place within settling vessel 903, where a substantial portion of solids may settle to the bottom, falling through throat 904 into auger screw casing 905. Partially clarified water filling preliminary settling vessel 903 may exit via conduit 906 into a first settling vessel 907. Auger exit pipe 908 may carry a slurry of placer silt to the top of particle separation apparatus 100.

System 900 further comprises one or more pumps (e.g., pumps 909 and 910) to circulate water between a plurality of settling vessels and particle separation apparatus 100 itself. In the illustrated embodiment, system 900 is self-contained, whereby all of the water required for operation of particle separation apparatus 100 is recirculated, requiring only small amounts of makeup water from an external source. Arrows in the diagram of FIG. 9 indicate direction of flow. In the embodiment depicted in FIG. 9, water is supplied to particle separation apparatus 100 via pumps 909 and 910 and conduits 911 and 912. In the illustrated example, conduit 911 supplies pumped filtered water to lower flow inlet port 109 treated through a fine filter (described below). Conduit 912 may supply pumped partially clarified water to flow inlet port 108.

As shown in FIG. 9, flow or pressure meters 913 and 914 may be used to monitor water flow rates into both chambers. External flow regulation valves (not shown, but may be integral with meters 913 and 914) may be mounted in line with meters 913 and 914 to regulate flow rates. Meters 913 and 914 monitor flow rates or pressure with conduits 911 and 912, respectively. Return water may exit particle separation apparatus 100 through flow outlet port 104. Exit water flow is shown to be directed to flow through conduit 915, where water and fine particulates are separated from coarser material, such as stones, by a mesh or other filter medium fitted at the junction of the bifurcation of conduit 915 and conduit 916. Water and fines exiting particle separation apparatus 100 may then flow into conduit 917, leading into settling vessel 918. Partially clarified overflow from vessel 918 may then flow out through conduit 919 to a fourth settling vessel (e.g., settling vessel 920).

Within settling vessel 920, separation tube 921 may house a fine filter medium, indicated by the hidden outlines within settling vessel 920. Separation tube 921 may aid in separation of remaining coarse particulates from the water, permitting water to flow into the lumen of separation tube 921, while particulates may settle outside of separation tube 921. Water within settling vessel 920 may be caused to infiltrate a fine filter cartridge (e.g., 2 micron) by suction created by pump 910. Filtered water may circulate though pump 910 via conduits 922 and 911, where conduit 911 connects with lower flow inlet port 109 and supplies filtered and clarified water to the lower chamber (e.g., lower chamber 202) of particle separation apparatus 100.

In the illustrated embodiment, portable sluice box 901 comprises a water spray system for washing placer dirt fines that are small enough to fall through matting mesh 902 and collect in preliminary settling vessel 903. Water spray may wash larger rocks and nuggets to the edge of sluice box 901. Partially clarified water may be supplied to settling vessel 929 via conduit 931 from settling vessel 907 and/or via conduit 932 from settling vessel 918. A filter 930 may be optionally within settling vessel 907, where charged feed fluid from conduit 906 may be filtered. Clean or clarified water from settling vessel 929 may be supplied through conduit 933 to the spray system comprising conduit 923, carrying water pressurized by pump 909, into perforated conduit 924. The latter may extend around the perimeter of sluice box 901, as shown. Larger materials that are too large to fall though matting mesh 902 may then washed to the bottom edge of portable sluice box 901, where discharge chute 925 is attached to receive rocks and guide their removal into bucket 926. Smaller nuggets may fall into slot 927, potentially rolling out onto side chute 928 for collection and/or disposal.

The exemplary deployment of particle separation apparatus 100 in silt processing system 900 provides for recirculation of water (or other suitable separation fluid) employed for the separation process. Other suitable methods of employment of particle separation apparatus 100 are equally possible. By attaching hoses or rigid conduit (e.g., conduits 911 and 912) to upper and lower flow inlet ports 108 and 109, respectively, whereby the hoses may be coupled to pumps (e.g., pumps 909 and 910), water, or another suitable separation fluid, may be delivered into upper and lower chambers 201 and 202, respectively. In the exemplary embodiment shown in FIG. 9, conduits 911 and 912 may be rigid pipes or flexible hoses.

By adjustment of the pressures and/or flow rates of the separation fluid by use of valves (not shown), impingement forces of vertical and tangential flows may be likewise regulated. During operation of particle separation apparatus 100, a static pressure in the lower chamber may be maintained to be greater than the static pressure in the upper chamber, forcing a continuous upward flow of separation fluid from the lower chamber (e.g., lower chamber 202) to the upper chamber (e.g., upper chamber 201).

According to some embodiments, water pressure in the lower chamber may be regulated to force an upward flow into the upper chamber, whereby the vertical flow impinging on high-density and heavy particles does not entrain at least a majority of the high-density and heavy particles that fall through the downspout (e.g., downspout 204 of partition 203). During operation of particle separation apparatus 100, tangential flow introduced through upper flow inlet port 108 above the partition (e.g., partition 203) may mix with the upward flow emerging from the lower chamber (e.g., lower chamber 202), creating an upwardly spiraling cyclonic flow.

Still referring to FIG. 9, high-density particle-bearing silt, for example, silt from a placer deposit bearing gold particles, may be introduced batch-wise into particle separation apparatus 100, for example, in a semi-continuous manner through sluice box 901 and auger 905. Sluice box 901 may be employed to classify the raw silt from coarser components, which may include pebbles, gravel, and/or organic debris. In some embodiments, silt may be dredged and conveyed (e.g., by a dredging machine or conveyer belt) continuously to sluice box 901 or an equivalent receiving structure. The dredged silt may require pre-mixing with water to liquefy the silt enough so that it may easily enter particle separation apparatus 100. Wash water may be added by perforated conduit 924 to aid in separation of silt from coarse components.

The silt entering into the upper chamber (e.g., upper chamber 201) begin to separate into low-density and high-density particles upon contact with the cyclonic flow. The internal cyclonic flow within particle separation apparatus 100 may be balanced by adjustment of the flow rates and/or pressures of separation fluid through upper and lower flow inlet ports 108 and 109 so that it readily carries low-density particulates (e.g., silica sand and clay particulates) upward and out of flow outlet port 104. At the same time, the cyclonic flow does not carry away high-density particulates, but allows them to fall by gravity into the lower chamber to gather in collection vessel 113.

In the embodiments described above, the partition (e.g., partition 203) may comprise a conical shape, or a sloped surface, such that high-density particulates impinging on the upper surface of the partition may slide into the downspout (e.g., downspout 204). From there, high-density particles fall against upward fluid flow, where the impinging upward flow through the downspout does not entrain the high-density particles.

As noted above, the offset of the feed tube (e.g., feed tube 207 or 301) may place high-density particles in proximity of the sidewall (e.g., sidewall 102) and of the partition (e.g., partition 203), separating them from strong tangential fluid forces that may exist near the center of the upper chamber. The disclosed internal geometry of particle separation apparatus 100 (or 200 equally) may enable a high-efficiency particle separation.

A waste stream may flow from flow outlet port 104. The waste stream may carry out lower-density particulates and silt material, such as sand, clays and minerals, including small stones, through conduit 915. In the illustrated embodiment, conduit 915 bifurcates into conduit 916, through which the coarser components may drop into a collection bucket or other vessel (not shown), while the exit water stream mostly drops into conduit 916, which may carry with it fine low-density silt that has been separated from high-density components into settling vessel 918 via interconnecting conduit 917.

Coarse or partial clarification may take place within vessel 918 by settling of particulate matter. This partially clarified water may be cascaded from vessel 918 to vessel 920 via conduit 919 interconnecting the two vessels, where vessel 920 serves as a second stage settling tank or vat. A filter element may be immersed in the partially clarified water within settling vessel 920, which filters water that is actively pumped out of this vessel by pump 910, supplying clean water to the lower flow inlet port 109. Overflow water from settling vessel 918 is also transferred to settling vessel 929, which receives overflow from settling vessel 907, also serving as a second settling stage. In turn, partially clarified water from settling vessel 929 is pumped via pump 909 to the upper chamber (e.g., upper chamber 201) via conduit 912.

Figure 10:
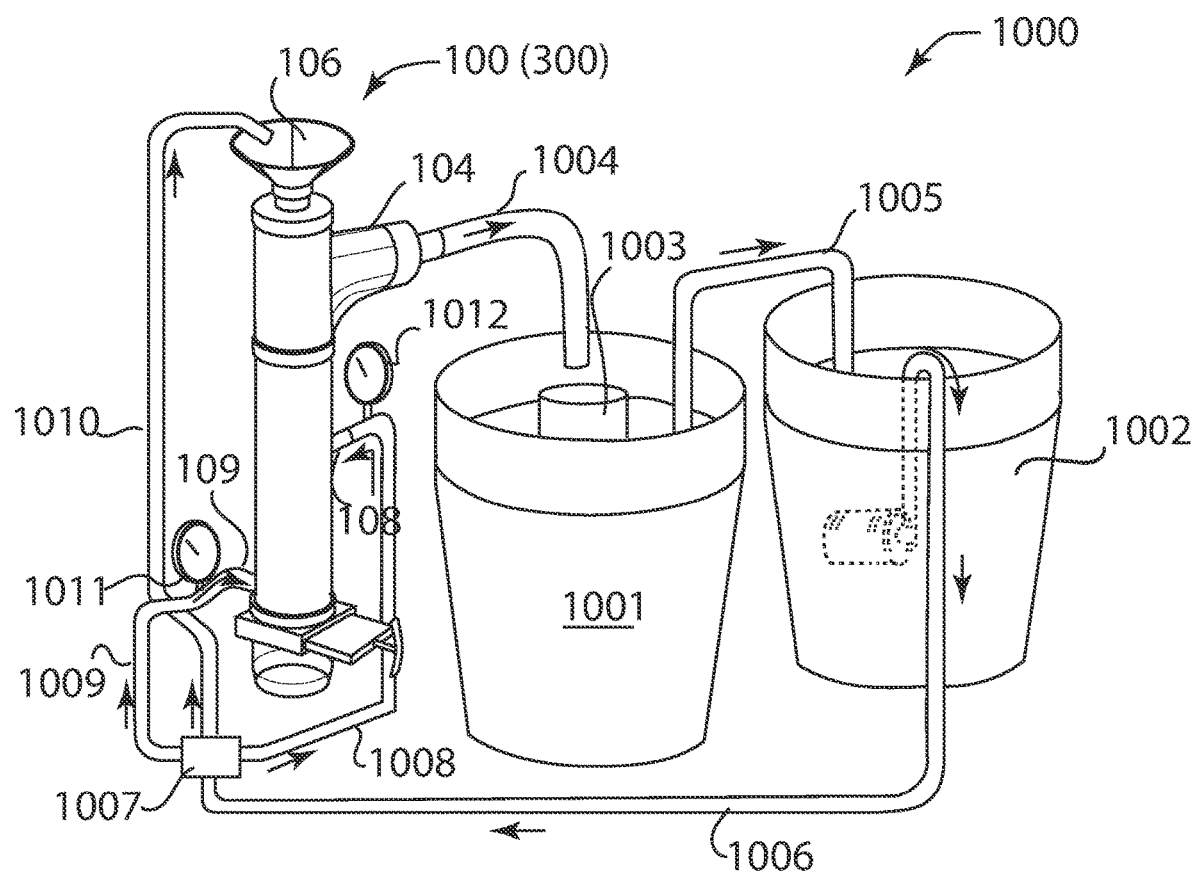
FIG. 10 illustrates a second exemplary system comprising particle separation apparatus shown in FIG. 1 or FIG. 2, according to some embodiments of the disclosure.

FIG. 10 illustrates an alternative exemplary system 1000 comprising particle separation apparatus 100 or 200, according to some embodiments of the disclosure. In the illustrated embodiment, system 1000 is a semi-continuous or continuous flow system. Arrows in the diagram of FIG. 10 indicate direction of flow. Separation fluid (e.g., water) is recycled by passage of burdened separation fluid, carrying lighter-density silt particles out of particle separation apparatus 100 (or particle separation apparatus 200) through flow outlet port 104 for continuous processing. System 1000 comprises settling vessels 1001 and 1002 for clarifying used separation fluid to remove coarse and fine silt particles from separation fluid before return to particle separation apparatus 100. In the illustrated example, filter 1003 receives separation fluid exiting through conduit 1004 as a waste separation fluid stream. Sand and other coarser particles may be captured by filter 1003, permitting finer particles to flow into settling vessel 1001.

Conduit 1005 may transfer partially clarified separation fluid from settling vessel 1001 to settling vessel 1002. Separation fluid may be transferred actively by a submerged pump (not shown) or by siphon action through conduit 1005. Settling vessel 1002 may be a second settling stage, permitting finer particles to settle out before returning the separation fluid to particle separation apparatus 100 (or particle separation apparatus 200). A pump (shown in hidden lines in the figure) within settling vessel 1002 may actively transfer pressurized clarified separation fluid to particle separation apparatus 100 (or particle separation apparatus 200) through conduit 1006. The pump is shown as a submersible pump in the illustrated example, but the pump may be external to settling vessel 1002.

Flow distribution manifold 1007 may distribute arriving clarified separation fluid into conduits 1008, 1009 and 1010. Gauges 1011 and 1012 may measure pressure or flow rate. While gauges 1011 and 1012 are shown as dial gauges, gauges 1011 and 1012 may be digital gauges mounted peripherally or in-line. Flow rates of at least two streams may be monitored by gauges 1011 and 1012. In the illustrated example, gauges 1011 and 1012 are proximal to upper and lower flow inlet ports 108 and 109, respectively, fed by conduits 1008 and 1009, respectively. Flow rates and/or pressure of fluid entering the two inlets may be regulated by valves (not shown) to produce internal cyclonic flow in the interior chambers of particle separation apparatus 100, as described above.

Conduit 1010 may intermittently direct flow of separation fluid to hopper 106. Hopper 106 may receive intermittently, semi-continuously or continuously charged batches of raw placer silt. Conduit 1010 may direct flow of water (clarified separation fluid) into hopper 106 to form a slurry with the raw placer silt.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

It will be appreciated by persons skilled in the art that the embodiments disclosed herein are exemplary and are by no means to be construed as limiting. Other variations of the described embodiments may be considered without deviating from the scope and spirit of the innovation, as claimed in the claims below.

We claim:

1. A particle separation apparatus, comprising:
   a first chamber over a second chamber, the first chamber having a first sidewall and the second chamber having a second sidewall;
   a partition between the first chamber and the second chamber, wherein the partition has an opening between the first chamber and the second chamber; and
   a feed tube extending through the first chamber, wherein the feed tube has a first end coupled to an inlet at an upper portion of the first chamber and a second end is proximal to a rim of the partition and is adjacent to the first sidewall, wherein a distance between the second end of the tube and the first sidewall is less than 50% of a radius of the first chamber.

2. The particle separation apparatus of claim 1, wherein a first flow inlet port is on the first sidewall and opens into the first chamber above the partition, and a second flow inlet port is on the second sidewall and opens into the second chamber below the partition.

3. The particle separation apparatus of claim 2, wherein the second sidewall is substantially tubular, and wherein a central axis of the second flow inlet port is substantially tangential to the second sidewall.

4. The particle separation apparatus of claim 1, wherein the tube is substantially straight and extends within the first chamber at an oblique angle with respect to-the first sidewall.

5. The particle separation apparatus of claim 1, wherein a first portion of the feed tube is parallel to the first sidewall, and a second portion of the feed tube is oblique to the first sidewall, and wherein the second portion extends from the first portion.

6. The particle separation apparatus of claim 1, wherein the partition comprises a downspout extending into the second chamber from the opening.

7. The particle separation apparatus of claim 1, wherein the partition has a substantially conical shape.

8. The particle separation apparatus of claim 1, wherein a top wall is over the first chamber, the top wall is coupled to the first sidewall, wherein the feed inlet is on the top wall and opens into the first chamber, and wherein a hopper is coupled to the feed inlet.

9. The particle separation apparatus of claim 8, wherein the hopper has a substantially conical shape.

10. The particle separation apparatus of claim 1, wherein a top wall is over the first chamber, the top wall is coupled to the first sidewall, wherein a feed inlet is on the top wall and opens into the first chamber, wherein an auger is coupled to the feed inlet.

11. The particle separation apparatus of claim 1, wherein a valve is coupled to a bottom wall of the second chamber, wherein the bottom wall is coupled to the second sidewall.

12. The particle separation apparatus of claim 11, wherein the valve is a sluice gate valve.

13. The particle separation apparatus of claim 11, wherein a collection vessel is below the valve.

14. The particle separation apparatus of claim 13, wherein the collection vessel comprises a threaded portion that is to be threaded onto the bottom wall.

15. The particle separation apparatus of claim 13, wherein the collection vessel comprises a flange, and wherein the flange is to be bolted onto the bottom wall.

16. The particle separation apparatus of claim 1, wherein a flow outlet port is on the upper portion of first sidewall and opens into the first chamber, and wherein the flow outlet port is above the second end of the tube.

17. The particle separation apparatus of claim 16, wherein the flow outlet port comprises a hose coupling.

18. The particle separation apparatus of claim 1, wherein the second end of the feed tube is a vertical distance from a rim of the partition, wherein the vertical distance is less than one fifth of a length of the first chamber.

19. The particle separation apparatus of claim 1, wherein the first sidewall and the second sidewall comprise any one of steel, aluminum, copper, brass, titanium, polymethyl methacrylate, polyethylene terephthalate, polypropylene, polyethylene, polyvinyl chloride, polyimides or silicate glass.

20. A system, comprising:
    a particle separation apparatus, comprising:
      a first chamber over a second chamber, the first chamber having a first sidewall and the second chamber having a second sidewall;
      a partition between the first chamber and the second chamber, wherein the partition has an opening between the first chamber and the second chamber; and
      a feed tube extending through the first chamber, wherein the feed tube has a first end coupled to an inlet at an upper portion of the first chamber and a second end is proximal a rim of to the partition and is adjacent to the first sidewall, wherein a distance between the second end of the tube and the first sidewall is less than 50% of a radius of the first chamber;

a vessel; and a first conduit coupled to a first flow inlet port on the first sidewall and a second conduit coupled to a second flow inlet port on the second sidewall.

21. The system of claim 20, wherein the first flow inlet port is a tangential flow inlet, and wherein the first conduit and the second conduit are coupled to a first flow regulation valve and a second flow regulation valve, respectively, and wherein the first flow regulation valve is coupled to the first flow inlet port and the second flow regulation valve is coupled to the second flow inlet port.

22. The system of claim 21, wherein the first and second conduits are coupled to a flow distribution manifold, and wherein a third conduit is coupled to a flow outlet port on the first sidewall, the third conduit extends from the flow outlet port to one or more settling vessels, and wherein a waste separation fluid stream comprising a particulate matter is to flow into the one or more settling vessels, and wherein the one or more settling vessels is to enable separation of the particulate matter from the waste separation fluid stream to produce a clarified separation fluid.

23. The system of claim 22, wherein a pump is coupled to the one or more settling vessels and to the flow distribution manifold, wherein the pump is operable to return the clarified separation fluid to the first and second chambers.

* * * * *